(12) United States Patent
Leon et al.

(10) Patent No.: US 7,542,435 B2
(45) Date of Patent: Jun. 2, 2009

(54) BUFFER LEVEL SIGNALING FOR RATE ADAPTATION IN MULTIMEDIA STREAMING

(75) Inventors: David Leon, Irving, TX (US); Miska Hannuksela, Tampere (FI); Emre Baris Aksu, Tampere (FI)

(73) Assignee: Nokia Corporation, Espoo (FI)

( * ) Notice: Subject to any disclaimer, the term of this patent is extended or adjusted under 35 U.S.C. 154(b) by 975 days.

(21) Appl. No.: 10/844,062

(22) Filed: May 12, 2004

(65) Prior Publication Data
US 2005/0254427 A1 Nov. 17, 2005

(51) Int. Cl.
H04L 12/56 (2006.01)
H04J 1/16 (2006.01)

(52) U.S. Cl. .............. 370/278; 370/252; 370/412; 370/419; 709/203; 709/231; 725/114

(58) Field of Classification Search ............... 370/252, 370/412, 419, 386, 278, 282; 709/231, 235, 709/203; 375/220–222, 240.35; 725/149, 725/151, 81, 114
See application file for complete search history.

(56) References Cited

U.S. PATENT DOCUMENTS

| | | | | |
|---|---|---|---|---|
| 5,565,924 | A | 10/1996 | Haskell et al. | 348/423 |
| 6,085,252 | A * | 7/2000 | Zhu et al. | 709/231 |
| 2003/0023746 | A1 * | 1/2003 | Loguinov | 709/235 |
| 2003/0236904 | A1 * | 12/2003 | Walpole et al. | 709/231 |
| 2004/0057420 | A1 | 3/2004 | Curcio et al. | 370/352 |
| 2004/0066742 | A1 | 4/2004 | Varsa et al. | 370/229 |
| 2004/0193762 | A1 | 9/2004 | Leon et al. | 710/52 |
| 2005/0188407 | A1 * | 8/2005 | van Beek et al. | 725/81 |
| 2005/0201471 | A1 * | 9/2005 | Hannuksela et al. | 375/240.25 |
| 2008/0104647 | A1 * | 5/2008 | Hannuksela | 725/114 |

FOREIGN PATENT DOCUMENTS

WO WO 2004/008673 1/2004

OTHER PUBLICATIONS

Network Working Group; Wenger et al.; "RTP Payload Format for H. 264 Video", draft-ietf-avt-rtp-h264-O5.txt; pp. 1-68; Apr. 2004.

(Continued)

Primary Examiner—John Pezzlo
(74) Attorney, Agent, or Firm—Ware, Freesola, Van Der Sluys & Adolphson, LLP

(57) ABSTRACT

In a multimedia streaming network where a client has a receiver buffer to store a plurality of packets received from a server so as to compensate for the difference between data transmission amount by the server and data usage amount by the client, the server should be able to adapt the data transmission rate based on the status of the receiver buffer. For rate adaptation purposes, server reconstructs a list of packets in the receiver buffer based on information provided by the client. The information signaled to the server is indicative of the next packet to be decoded in the client. The information can be the sequence number of the next packet to be decoded, the DON number of the next NAL unit to be decoded, or the sequence number of the packet carrying the next NAL unit to be decoded and the DON indicative of the decoding order of that next NAL unit.

33 Claims, 3 Drawing Sheets

OTHER PUBLICATIONS

3GPP TS 26.234 V5.0.0; "Transparent end-to-end packet switched streaming service (PSS); Protocols and codecs (Release 5)"; pp. 1-176; 2002.

Joint Video Team of ISO-IEC MPEG and ITU-T VCEG; "Draft ISO-IEC 14496-10, Document JVT-E146d7"; pp. 1-176; 2002.

3GPP TSG-SA4#31 meeting; "Signalling for rate adaptation with AVC codec"; pp. 1-45; May 17-21, 2004; Montreal, Canada.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|X|  CC   |M|     PT      |       sequence number         |
+-+-+-+-+-+-+-+-+-+-+-+-+-+-+-+-+-+-+-+-+-+-+-+-+-+-+-+-+-+-+-+-+
|                           timestamp                           |
+-+-+-+-+-+-+-+-+-+-+-+-+-+-+-+-+-+-+-+-+-+-+-+-+-+-+-+-+-+-+-+-+
|           synchronization source (SSRC) identifier            |
+=+=+=+=+=+=+=+=+=+=+=+=+=+=+=+=+=+=+=+=+=+=+=+=+=+=+=+=+=+=+=+=+
|            contributing source (CSRC) identifiers             |
|                             ....                              |
+-+-+-+-+-+-+-+-+-+-+-+-+-+-+-+-+-+-+-+-+-+-+-+-+-+-+-+-+-+-+-+-+
```

Figure 2

BUFFER LEVEL SIGNALING FOR RATE ADAPTATION IN MULTIMEDIA STREAMING

FIELD OF THE INVENTION

The present invention relates generally to multimedia streaming and, more particularly, to rate adaptation between a server and a client in multimedia streaming services.

BACKGROUND OF THE INVENTION

In a multimedia streaming service, there are three participants involved: a streaming server, a streaming client and a transmission channel or an underlying network. Usually it is the transmission channel that is the bottleneck of the service, both in terms of throughput and in terms of reliability (i.e., if no throughput bitrate guarantee is assumed), but throughput limitations can occur also at the client and/or at the server.

In a real-time streaming system, due to the dynamically changing throughput characteristics of the channel, client and server, the streaming delivery needs to be adaptive in order to maintain a real-time playback experience for the user. The server should adapt the transmission rate to the varying throughput of the system. An example of such a rate adaptation system can be found in Haskell et al. (U.S. Pat. No. 5,565,924, "Encoder/Decoder Buffer Control for Variable Channel").

The streaming client provides receiver buffering for storing incoming data before passing them to the media decoder for playout. The receiver buffer is used to compensate for the difference between source encoding rate (also referred to as sampling rate) and transmission rate (pre-decoder buffering). It is also used to compensate for the packet transfer delay variation over the channel (jitter buffering). In general, these two functions are assumed to be combined in a single receiver buffer. However, they can also be implemented with two separate buffers in a receiver, although such an implementation is not optimum from a delay point of view. Receiver buffering can also smooth out the adaptation inaccuracies (i.e. if the system throughput is not matched exactly by the server output).

If the receiver buffer becomes empty (i.e. buffer underflow), which means that the decoder is running out of data to decode, the client needs to pause playout and re-buffer incoming data before resuming. On the other hand, if the incoming data rate is faster than the playout rate, then the receiver buffer space can be exhausted (i.e., buffer overflow), which can result in dropping packets from the buffer in order to make room for new incoming packets. When the packets are dropped, the video quality is degraded. To ensure a smooth and flawless playout, the receiver buffer of the client should be kept within a certain fullness range. In order to guarantee that the receiver buffer will not underflow or overflow, the bitrate for transmission and sampling at the server and that for reception and playout at the client must be adequately controlled.

3GPP rate adaptation signaling as defined in 3GPP TS 26.234 is based on feedback sent from the receiver to the sender in the form of an RTCP APP (Application-Defined Real Time Control Protocol) packet. This packet includes the sequence number (SN) of the oldest packet in the receiver buffer. This SN is referred to as OBSN (oldest buffered sequence number).

The signaling of the OBSN allows the sender to perform the necessary adaptation. Yet, if the decoding order and the display order are different, the sender may not be able to derive the status of the buffer and the purpose of the signaling would be defeated. With the PSS (Packet Switched Streaming Service) video codecs supported in Release 5, this is not a problem as their packet transmission order is equal to the decoding order.

In Release 6, H.26L (also known as H.264) will be added to the list of the PSS codecs. With H.26L, the transmission order and the decoding order could be different because of interleaved packetization at the payload level (as specified in the IETF H.26L payload format draft).

The same property also exists for the frame-interleaved transmission of many audio and speech codecs, such as AMR-NB, AMR-WB, AMR-WB+, AAC and AACPlus (for the latter, the interleaving method defined in RFC 3640 is used).

The problem is hereafter illustrated assuming that the server transmits a series of packets whose RTP sequence numbers are denoted x, x+1, x+2, x+3, ... The DON (Decoding order number) defined by the H.26L payload format maps these sequence numbers to a decoding order y. The decoding order y is defined as follows: If a packet has a decoding order y, it is the $y^{th}$ packet to be decoded. That is, when the current packet has a decoding order y, it also means that (y−1) packets have already been decoded by the time the current packet is given to the decoder. Although the y value is derived from the DON value, these two values are not always the same.

The following example illustrates the differences between the sequence numbers of packets and their corresponding decoding orders:

| x | y |
|---|---|
| x + 1 | y + 1 |
| x + 2 | y + 2 |
| x + 3 | y + 3 |
| x + 4 | y + 100 |
| x + 5 | y + 101 |
| x + 6 | y + 4 |
| x + 7 | y + 5 |
| ... | ... |
| x + 101 | y + 99 |
| x + 102 | y + 102 |

In the above-given example, the decoding order is equal to the sequence number (SN) from packet x to packet x+3. However, the decoding order and the sequence number are not the same for packets x+4 and x+5. Packets x+4 and x+5, for example, may be two packets of a frame that will be decoded only in the future.

Let us now look at the evolution of the receiver buffer and assume that, at a certain time, the receiver has received packets x, x+1, x+2, x+3. In this situation, the oldest sequence number in the buffer (OBSN) is x, and the highest received sequence number (HSN) signaled in RTCP RR reports is x+3. As time progresses, packet of SN x has been decoded and packet of SN x+4 has been received. Accordingly, the server will signal to the client OBSN=x+1 (the new "oldest" sequence number in the buffer) and HSN=x+4 (the new "most recent" SN received).

As time further progresses to the time when x+1, x+2 and x+3 have been played and x+5, x+6 and x+7 have been received, for example. At that point, the state of the buffer is x+4, x+5, x+6 and x+7. Accordingly, the client will signal to the server OBSN=x+4 and HSN=x+7. The problem arises around this time because after x+5, the decoding order number for the following packets: x+6, x+7, etc. is smaller than the decoding order number at x+4. Accordingly, the current rate adaptation signaling OBSN will remain at x+4 until the packet x+102 is received, at which time the OBSN will be updated. The server will thus lose track of the receiver buffer status because OBSN is not updated according to the decoding and the removal of packets from the receiver buffer.

For AMR-NB and AMR-WB, RFC 3267 defines how interleaving can be used. For AMR-WB+, the same interleaving rules defined for AMR-WB apply. There are two relevant parameters signaled inside the payload headers: ILL and ILP. Moreover, the number of frames per AMR packet is fixed to a certain number (let's say N). These three values define a mathematically deterministic method for defining the order of frames to be present in an RTP payload present inside an AMR RTP packet.

It can be seen that there is no notion of hard-coded DON in AMR as in H.26L, since each frame has a deterministic decoding order based on ILL, ILP and N values signaled in the RTP payload header. AMR-wise DON is interpreted by the client and server by making use of the first RTP Sequence number signaled in RTSP PLAY response and with (ILL, ILP, N) triplet. The same problem statement mentioned for the H.26L case is valid for interleaved streaming of AMR-NB, AMR-WB and AMR-WB+.

In sum, the prior art method of rate adaptation signaling is based on the oldest packet currently in the receiver playout buffer, allowing the sender to estimate both the number of bytes in the receiver buffer and the duration of the playout buffer. This information is used by the sender to perform adaptation so as to avoid receiver underflow (playout interruption) or receiver overflow (packet loss). However, because the decoding order and the transmission order are not the same in some occasions, the sender may lose track of the receiver buffer.

A typical RTP packet is shown in FIG. 1. The RTP packet includes a multi-time aggregation packet of type MTAP16 and two multi-time aggregation units. The RTP Header in the first row of the packet is shown in FIG. 2. As shown in FIG. 2, the sequence number (SN) of the packet is shown in the first row of the RTP header. As shown in FIG. 1, the aggregation type packet aggregates multiple Network Abstraction Layer (NAL) units into a single RTP payload. In particular, in MTAP16s, the NAL unit payload consists of a 16-bit unsigned decoding number order (DON) base, or DONB (see second row of the packet). DONB contains the value of DON of the first NAL unit, so that the value of DON of all other NALs can be expressed in DOND, or the difference between the value of DON in a certain NAL and DONB.

The RTP payload format for H.264 codec can be found in the IETF Audio Visual Transport Working Group Internet Draft draft-ietf-avt-rtp-h264-05 (April 2004).

SUMMARY OF THE INVENTION

The present invention provides a mechanism for the server device in a multimedia streaming network, which sends streaming data packets to a client device to playout to reconstruct a list of data packets stored in the receiver buffer in the client device. Based on the reconstruction, the server client adjusts the streaming data amount provided to the client device, so as to control the level of the receiver buffer.

Thus, the first aspect of the present invention provides a method for controlling level of a receiver buffer in a client in a multimedia streaming network, the streaming network comprising a server for providing streaming data in a plurality of packets to the client, wherein at least some of the data packets are stored in the receiver buffer so as to compensate for difference between data transmission amount by the server and the data usage amount by the client, and wherein the packets are decoded in a decoding order based on a plurality of decoding order values associated with a playout order the client.

The method comprises:
determining in the client the next packet to be decoded among the packets in the receiver butter based on the decoding order values; and
signaling to the server information indicative of said next packet to be decoded, so as to allow the client to adjust the streaming data amount provided to the client based on the information.

According to the present invention, each of the data packets has a sequence number known to both the client and the server, and the information signaled to the server is indicative of the sequence number of said next packet to be decoded.

According to the present invention, the server maintains a list of packet sequence numbers that have been sent and a mapping between said sequence numbers and the decoding order for determining the data packets in the receiver buffer based on said mapping so as to adjust the streaming data amount provided to the client based on said determination in the server.

According to the present invention, the information signaled to the server is further indicative of a difference between a scheduled playout time of said next packet to be decode and the decoding time of said next packet.

According to the present invention, the information signaled to the server is further indicative of the highest sequence number received by the client so as to allow the server to determine the data packets in the receiver buffer.

According to the present invention, the data packets carry a plurality of network abstraction layer (NAL) units, each NAL unit having a decoding order and a decoding order number (DON) indicative of a NAL unit decoding order in a payload structure for transmission, and the information signaled to the server is indicative of the DON associated with said next NAL to be decoded.

According to the present invention, the server maintains a list of NAL units that have been sent and a mapping between said NAL units and the decoding order for determining the data packets in the receiver buffer based on said mapping so as to adjust the streaming data amount provided to the client based on said determination in the server.

According to the present invention, the data packets carry a plurality of network abstraction layer (NAL) units, each NAL unit having a decoding order, and a decoding order number (DON) indicative of a NAL unit decoding order in a payload structure for transmission, and the information signaled to the server is indicative of the sequence number of the data packet that carries the next NAL to be decoded and the DON associated with the decoding order of said next NAL.

The second aspect of the present invention provides a multimedia streaming network comprising:
at least a client; and
a server for providing streaming data in a plurality of packets to the client, wherein the client comprises:
a receiver buffer for storing at least some of the data packets to be decoded so as to compensate for difference between data transmission amount by the server and data usage amount by the client, and wherein the packets are decoded in a decoding order based on a plurality of decoding values associated with a playout order in the client, and
a mechanism for signaling to the server information indicative of the next packet to be decoded among the packets in the buffer based on the decoding order values so as to allow the server to adjust the rate of streaming data provided to the client, wherein each of the data packets has a sequence number known to both the client and the server, and wherein the information signaled to the server is indicative of the sequence number of said next packet to be decoded, and wherein the information signaled to the server is further indicative of a difference between a scheduled playout time of said next packet to be decode and the decoding time of said next packet, and the information signaled to the server is further indicative of the highest sequence number received by the client so as to allow the server to determine the data packets in the receiver buffer.

According to the present invention, the server maintains a list of packet sequence numbers that have been sent and a mapping between said sequence numbers and the decoding order for determining the data packets in the receiver buffer based on said mapping so as to adjust the streaming data amount provided to the client based on said determination in the server.

Alternatively, the data packets carry a plurality of network abstraction layer (NAL) units, each NAL unit having a decoding order and a decoding order number (DON) indicative of a NAL unit decoding order in a payload structure for transmission, and wherein the information signaled to the server is indicative of the DON associated with said next NAL to be decoded. The server maintains a list of NAL units that have been sent and a mapping between said NAL units and the decoding order for determining the data packets in the receiver buffer based on said mapping so as to adjust the streaming data amount provided to the client based on said determination in the server.

Alternatively, the data packets carry a plurality of network abstraction layer (NAL) units, each NAL unit having a decoding order, and a decoding order number (DON) indicative of a NAL unit decoding order in a payload structure for transmission, and wherein the information signaled to the server is indicative of the sequence number of the data packet that carries the next NAL to be decoded and the DON associated with the decoding order of said next NAL.

The third aspect of the present invention provides a client device in a multimedia streaming network, the streaming network comprising a server device for providing streaming data in a plurality of packets to the client device, wherein the packets are decoded in a decoding order based on a plurality of decoding values associated with a playout order in the client device. The client device comprises:

a receiver buffer for storing at least some of the data packets to be decoded so as to compensate for difference between data transmission amount by the server device and the data usage amount in the client device; and a mechanism for signaling to the server device information indicative of the next packet to be decoded among the packets in the receiver buffer based on the decoding order values so as to allow the server device to adjust the streaming data amount provided to the client device.

According to the present invention, each of the data packets has a sequence number known to both the client device and the server device, and the information signaled to the server device is indicative of the sequence number of said next packet to be decoded.

According to the present invention, the data packets carry a plurality of network abstraction layer (NAL) units, each NAL unit having a decoding order and a decoding order number (DON) indicative of a NAL unit decoding order in a payload structure for transmission, and wherein the information signaled to the server device is indicative of the DON associated with said next NAL to be decoded.

According to the present invention, the data packets carry a plurality of network abstraction layer (NAL) units, each NAL unit having a decoding order, and a decoding order number (DON) indicative of a NAL unit decoding order in a payload structure for transmission, and wherein the information signaled to the server device is indicative of the sequence number of the data packet that carries the next NAL to be decoded and the DON associated with the decoding order of said next NAL.

According to the present invention, the client device further comprises:

a software program having executable codes for determining:

the decoding order of the data packets in the receiver buffer based on the decoder order values, and the next packet to be decoded among the data packets in the receiver buffer based on the decoding order values.

The fourth aspect of the present invention provides a server device for providing streaming data in a multimedia streaming network, the multimedia streaming network comprising at least a client device for receiving the streaming data in a plurality of data packets and decoding the data packets in a decoding order based on a plurality of decoding order values associated with a playout order, wherein the client device has a receiver buffer for storing at least some of the data packets so as to compensate for difference between data transmission amount by the server device and the data usage amount by the client device. The server device comprises:

a mechanism for receiving information from the client device indicative of the next packet to be decoded among the packets in the receiver buffer based on the decoding order values in the client device; and a software program for determining the packets in the receiver buffer based on the information so as to adjust the streaming data amount provided to the client device for controlling level of the receive buffer.

According to the present invention, each of the data packets has a sequence number known to both the client device and the server device, and wherein the information received from the client device is indicative of the sequence number of said next packet to be decoded.

According to the present invention, the data packets carry a plurality of network abstraction layer (NAL) units, each NAL unit having a decoding order and a decoding order number (DON) indicative of a NAL unit decoding order in a payload structure for transmission, and wherein the information received from the client device is indicative of the DON associated with said next NAL to be decoded.

According to the present invention, the data packets carry a plurality of network abstraction layer (NAL) units, each NAL unit having a decoding order, and a decoding order number (DON) indicative of a NAL unit decoding order in a payload structure for transmission, and wherein the information received from the client device is indicative of the sequence number of the data packet that carries the next NAL to be decoded and the DON associated with the decoding order of said next NAL.

The fifth aspect of the present invention provides a software product for use in a client device in a multimedia streaming network, the streaming network comprising a server device for providing streaming data in a plurality of packets to the client device, wherein the packets are decoded in a decoding order based on a plurality of decoding values associated with a playout order in the client device, and wherein the client device comprises a receiver buffer for storing at least some of the data packets to be decoded so as to compensate for difference between data transmission. The software product comprises:

a code for determining the decoding order of the data packets in the receiver buffer based on the decoding order values; and a code for determining the next packet to be decoded among the data packets in the receiver buffer based on the decoding order values, so as to provide to the server device information indicative of said next packet to be decoded, allowing the server device to adjust the streaming data amount provided to the client device based on the information for controlling level of receiver buffer.

The sixth aspect of the present invention provides a software product for use in a server device providing streaming data in the multimedia streaming network, the multimedia network comprising at least a client device for receiving the streaming data in a plurality of data packets and decoding the data packets in a decoding order based on a plurality of decoding order values associated with a playout order, wherein the client device has a receiver buffer for storing at least some of the data packets so as to compensate for difference between the transmission amount by the server device and the data usage amount by the client device. The software product comprises:

a code for relating the decoding order to the sequence numbers of the data packets having been sent to the client device; and a code for determining the data packets in the receiver buffer based on said relating and on information provided by the client device indicative of the next packet to be decoded in the client device, so as to allow the server device to adjust the streaming data amount provided to the client device for controlling level of the receiver buffer.

BRIEF DESCRIPTION OF THE DRAWING

FIG. 2 is a block diagram showing a typical RTP header.

DETAILED DESCRIPTION OF THE INVENTION

Figure 1:
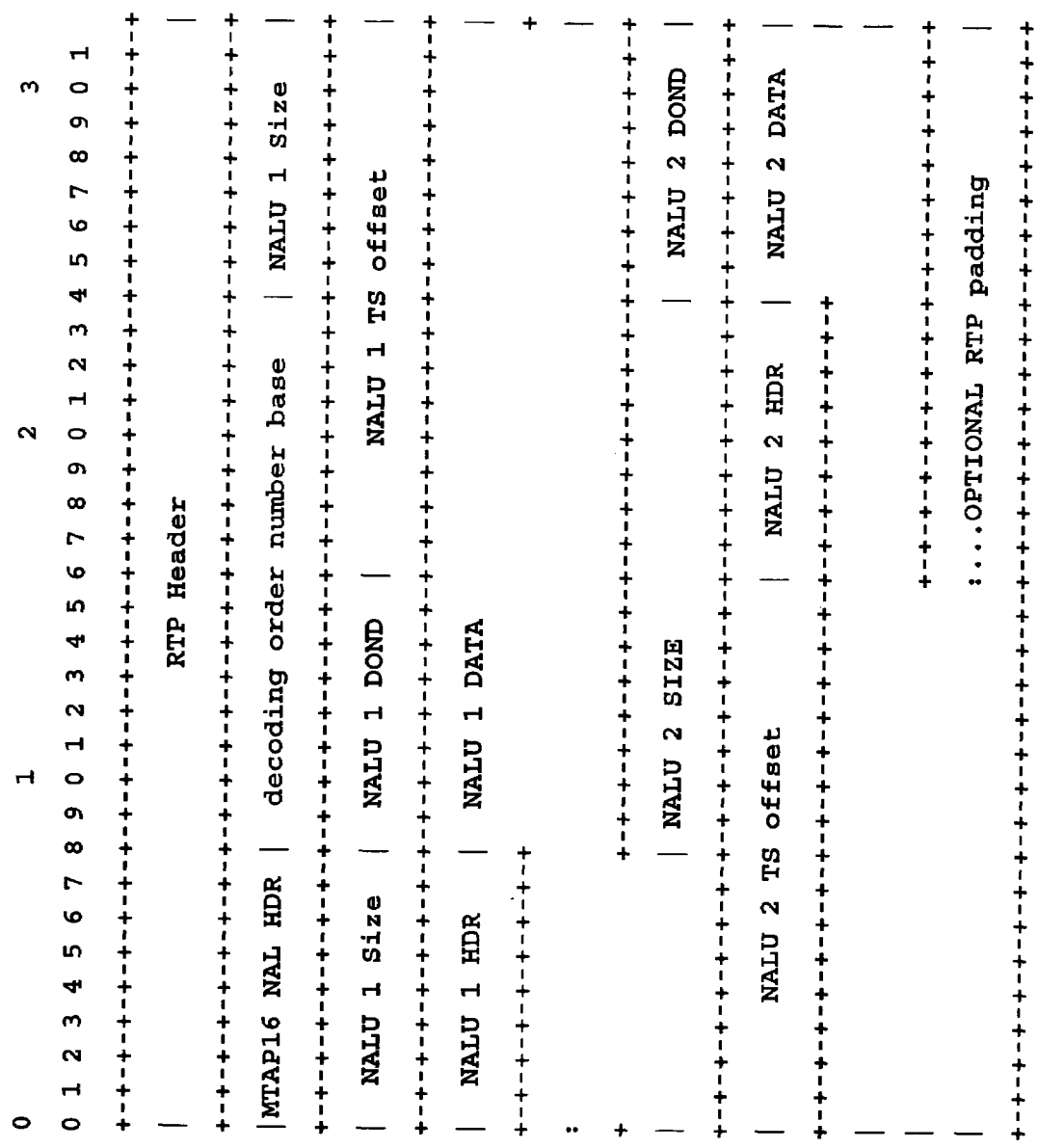
FIG. 1 is a block diagram showing a typical RTP packet.

The present invention provides a method of buffer level signaling so as to allow the server in a multimedia streaming network to perform rate adaptation in codecs such as H.26L, for which packet transmission order is different from decoding order. The buffer level signaling method, according to the present invention, is based on information about the next packet to be decoded. The sequence number of the next packet to be decoded is referred to as NDSN. Several implementations are described below:

IMPLEMENTATION I

The receiver reports to the sender information of the next packet to be decoded based on the smallest y value. Based on the received NDSN, the server can identify the packet to be decoded next. As such, the sender can derive the correct status of the receiver buffer. Using the set of x and y values given in the background section, this implementation can be illustrated as follows:

When packets x+4, x+5, x+6 and x+7 have been received, their corresponding decoding order is y+100, y+101, y+4 and y+5. Thus, x+6 has the smallest decoding order value of y+4.

Accordingly, the next packet to be decoded and the corresponding NDSN is x+6. The receiver also sets HSN=x+7 as always because this is the latest received sequence number. The above-discussed situation is shown in TABLE I:

TABLE I

| Decoding Order value | Packets in receiver buffer | NDSN | HSN | Smallest SN not decoded |
|---|---|---|---|---|
| . | . | . | . | . |
| . | . | . | . | . |
| . | . | . | . | . |
| y + 2 | x + 2, x + 3, x + 4, x + 5 | x + 2 | x + 5 | x + 2 |
| y + 3 | x + 3, x + 4, x + 5, x + 6 | x + 3 | x + 6 | x + 3 |
| y + 4 | x + 4, x + 5, x + 6, x + 7 | x + 6 | x + 7 | x + 4 |
| y + 5 | x + 4, x + 5, x + 7, x + 8 | x + 7 | x + 8 | x + 4 |
| . | . | . | . | . |
| . | . | . | . | . |
| . | . | . | . | . |

Note: when decoding order value = y + 3, NDON = the DON of the NAL unit carried by packet x + 3; when decoding order value = y + 4, NDON = the DON of the NAL unit carried by packet x + 6.

Based on the received NDSN, the sender is able to get an accurate estimation of which packets are in the receiver buffer because it can map locally the sequence numbers to their decoding orders—the sender keeps a list of the sequence numbers and the way these sequence numbers are mapped to the decoding order. In this example, the sender knows that x+4 has a decoding order higher than x+7. It can conclude that x+4 is in the buffer and thus determine what other packets are currently in the buffer.

Additionally, the sender can get a more accurate measurement of the receiver buffer duration through the signaling of an optional playout delay parameter. The playout delay is defined as the difference between the scheduled playout time of the next packet to decode and the decoding time of this packet (i.e. the packet of sequence number NDSN).

IMPLEMENTATION I can thus be summed up as follows:

At the receiver side:
  Compute the decoding order (y values) of the packets that are currently in the buffer;
  Find the next packet to be decoded (packet with the smallest y value); and
  Signal the sequence number of the next packet to be decoded (call this NDSN).

At the sender side:
  Keep a list of packet sequence numbers (L) that have been sent, and the mapping from the sequence numbers to a decoding order;
  Look up the NDSN and the HSN signalled by the receiver in RTCP RR or SR report;
  Reconstruct the list of packets in the receiver buffer, by looking up in L all the packets whose sequence number satisfies: 1) the decoding order associated with the sequence number in the list is higher than the decoding order that maps to the NDSN sequence number and 2) the sequence number is smaller than the highest sequence number received (HSN).

IMPLEMENTATION II

With IMPLEMENTATION I, there can still be ambiguity if MTAPs (Multi-Time Aggregation Packets, as defined in the H.264 payload format) are used. An aggregation packet type is used to aggregate multiple NAL (Network Abstraction Layer) units into a single RTP payoad. All NAL units consist of a single NAL unit type octet, which also co-serves as the payload header of this RTP payload format. In MTAPs, the NAL unit payload consists of a 16-bit unsigned decoding number order base (DONB) and one or more multi-time aggregation units. DONB must contain the value of DON for the first NAL unit in the NAL unit decoding order among the NAL units of the MTAP. The problem arises from the fact that NALs from different frames can be included in the same RTP packet and thus have the same SN. Subsequently, when an NDSN is reported, it is not known which of the packet NALs will be decoded next. If the possible sampling time differences between different NALs belonging to the same packet is limited, IMPLEMENTATION I could lead to some inaccuracies in the buffer estimation. When the sender packetization is such that there can be high differences between the sampling times of NALs in the same packet, then estimation according to IMPLEMENTATION I may fail altogether.

In IMPLEMENTATION II, this ambiguity is solved by sending the DON of the next NAL to decode (NDON) instead of the sequence number The same sender and receiver algorithms as those described in IMPLEMENTATION I can be used. The difference between IMPLEMENTATION II and IMPLEMENTATION I is that NDON is signalled instead of NDSN (see the note below TABLE I). Thus, IMPLEMENTATION II can be summed up as follows:

At the receiver side:
  Compute the decoding order (y values) of the NALs that are currently in the buffer;
  Find the next packet to be decoded (packet with the smallest y value); and
  Signal the DON of the next packet to be decoded (call this NDON)

At the sender side:
  Keep a list (L) of NALs that have been sent. For each NAL, keep a record of the sequence number (SN) of the packet in which the NAL was sent, its DON value and the mapping from NALs to a decoding order;
  Look up the NDON and the HSN signalled by the receiver; and
  Reconstruct the list of NALs in the receiver buffer, by looking up in L all the NALs whose recorded information conforms to: 1) the decoding order associated with the NAL in L is higher than the decoding order that maps to the signalled NDON and 2) the sequence number is smaller than the highest sequence number received (HSN).

For AMR (-NB, -WB and -WB+), the calculation of DON is done as follows: Assumptions:
  ILL=L for the interleave group that starts at speech frame-block "n".
  The first payload packet of the interleave group is "s", with n RTP sequence number as "SN"
  The number of speech frame-blocks carried in each payload is N
  The Sequence Number of the first AMR audio packet is "SN0"

AMR Payload s (the first packet of this interleave group):
  ILL=L, ILP=0,
  Carry frame-blocks: n, n+(L+1), n+2*(L+1), ..., n+(N−1)*(L+1)

Payload s+1 (the second packet of this interleave group):
  ILL=L, ILP=1,
  frame-blocks: n+1, n+1+(L+1), n+1+2*(L+1), ..., n+1+(N−1)*(L+1) ...
  ...

Payload s+L (the last packet of this interleave group):
  ILL=L, ILP=L,
  frame-blocks: n+L, n+L+(L+1), n+L+2*(L+1), ..., n+L+(N−1)*(L+1)

The next interleave group will start at frame-block n+N*(L+1).

In an interleave group that starts at speech-frame block n, the decoding order of the $i^{th}$ AMR frame in the AMR payload with ILP=I is:

$$DON(i) = (n+j) + i*(L+1)$$

where
  i=0, ..., N−1 and is an integer
  j=0, ..., L and is an integer
  n can be calculated based on the ILL, N, initial and current AMR payload's sequence numbers as follows:

$n = (\text{Floor}[(SN-SN0)/(L+1)]) * N * (L+1)$ and n is an integer.

For the first AMR packet received, the DON of the first AMR frame is zero. As both the server and the client are aware of the first RTP sequence number (server by sending it, client by checking the RTSP PLAY response and the RTP-Info header's "seqnum" field), it is straightforward to make such a labelling. Then, DON of each AMR frame can be calculated by using ILL, ILP and N.

IMPLEMENTATION III

As defined in H.264 codecs, when signaling the value of DON in an MTAP, the DON value of the first NAL unit in transmission order may be set to any value. Values of DON are in the range of 0 to 65535, inclusive. After reaching the maximum value, the value of DON wraps around to 0. Thus, with IMPLEMENTATION II, the DON may wrap around, which would create ambiguities at the server. This is because the DON field has fewer bits than the SN field and the DON can be sparse (a sender could for some reason use a high DON increment between consecutive NALs).

In IMPLEMENTATION III, the receiver uniquely identifies the next NAL by the packet SN in which it is carried and the DON value. Thus, the receiver signals to the server the sequence number of the packet carrying the next NAL unit and the DON number indicative of the decoding order of that next NAL unit. If there is no other NAL in the packet, the DON need not be sent.

IMPLEMENTATION III can be summed up as follows:

At the receiver side:
  Compute the decoding order (y values) of the NALs that are currently in the buffer;
  Find the next packet to be decoded (packet with the smallest y value); and
  Signal the DON of the next packet to be decoded (call this NDON) and the sequence number of the next packet to be decoded (call this NDSN).

At the sender side:
  Keep a list (L) of NALs that have been sent. For each NAL, keep a record of the sequence number (SN) of the packet in which the NAL was sent, its DON value and the mapping from the NALs to a decoding order;
  Look up the NDON, the NDSN and the HSN signalled by the receiver; and Reconstruct the list of NALs in the receiver buffer, by looking up in L all the NALs whose recorded information conforms to: 1) the decoding order associated in the NAL in L is higher than the decoding order that maps to the signalled NDON and the signal NDSN and 2) the sequence number is smaller than the highest sequence number received (HSN).

Figure 3:
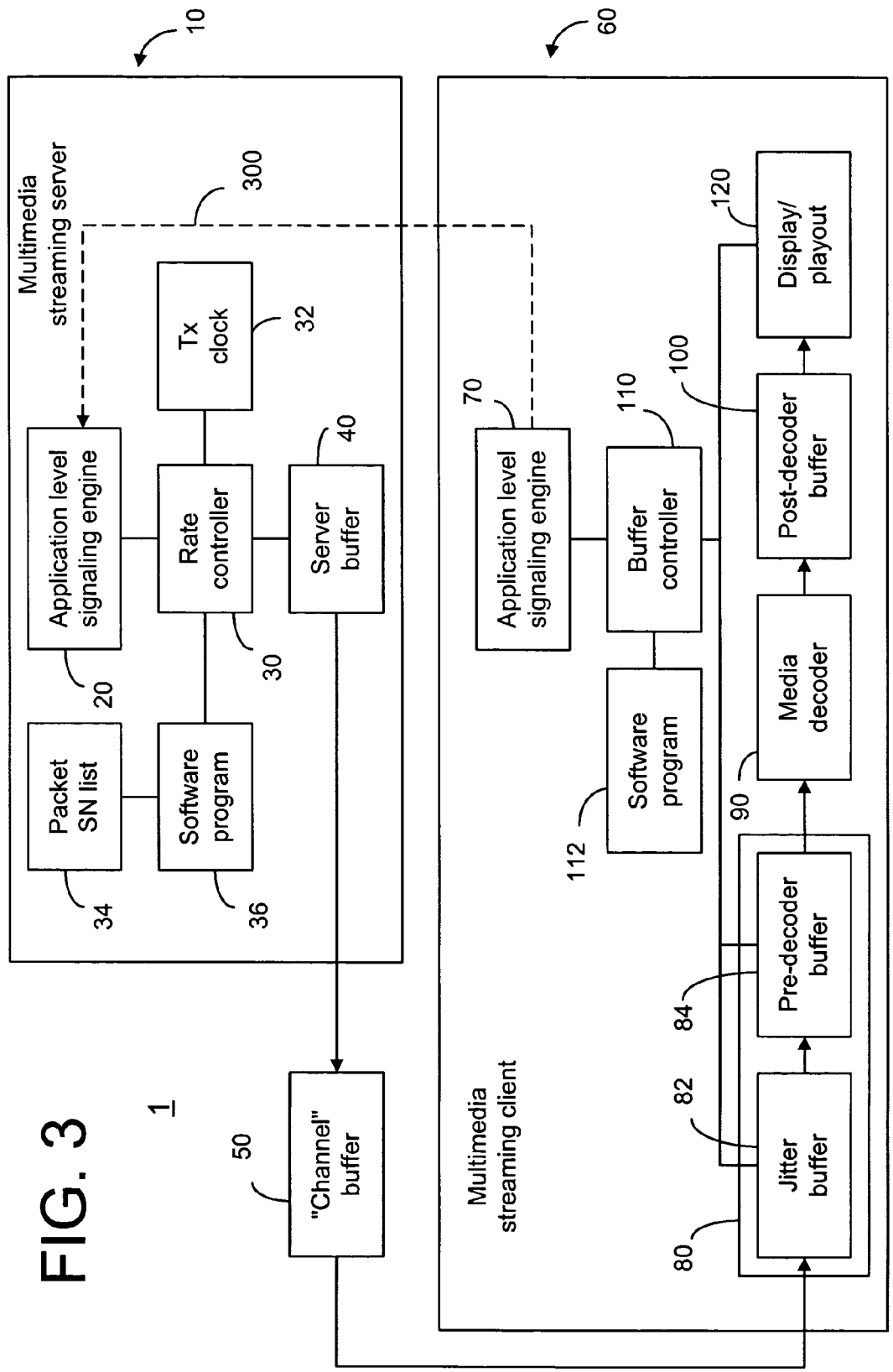
FIG. 3 is a block diagram showing a multimedia streaming system having a server device and a client device that can perform the rate adaptation method, according to the present invention.

In order to illustrate how the method of buffer level signaling for rate adaptation is carried out, a multimedia streaming system is shown in FIG. 3. As shown, the multimedia streaming system 1 has means for buffer level signaling from a streaming client 60 to a streaming server 10.

The streaming server 10 comprises an application level signaling engine 20, a rate controller 30 and a server buffer 40. The streaming client 60 comprises an application level signaling engine 70, corresponding to, and adapted to communicate with, the application level signaling engine 20 in the streaming server 10. It further comprises a client buffer 80 which, in the embodiment of the invention illustrated in FIG. 3, comprises a jitter buffer 82 and a pre-decoding buffer 84, integrated as a single unit. In other embodiments of the invention, streaming client 60 may include a jitter buffer and a pre-decoding buffer that are implemented separately. The streaming client further comprises a media decoder 90, a post-decoder buffer 100, a buffer controller 110 and a display/play-out device 120.

The system depicted in FIG. 3 is further shown to comprise a "channel buffer" 50 located between streaming server 10 and streaming client 60, representing the varying transfer delays that occur during transmission of data packets from the streaming server to the client.

The server's rate controller 30 is operative to adapt the rate at which media data is transmitted from the streaming server. The server also has a transmission clock 32 to timestamp the packets to be transmitted to the client. It operates by adjusting the transmitted data rate in accordance with the varying bit-rates on the transmission channel, taking into account the client's request for a transmission time-shift, thereby seeking to avoid pauses in play-back at the client due to pre-decoder buffer underflow or dropping packets at the client due to buffer overflow.

Server buffer 40 stores data packets temporarily before they are transmitted from the streaming server across the transmission channel to streaming client 60. In a "live" streaming scenario where data packets are sampled real-time, the server buffer is indeed a physical buffer where data packets are placed at sampling time and are extracted at transmission time. In a "pre-encoded" streaming scenario, where data packets are not sampled real-time but are stored in a pre-encoded file and are read from the file at transmission time, the server buffer is a virtual buffer that represents the difference between sampling time (with reference to a sampling clock started at the streaming server when the first data packet of the pre-encoded file is transmitted) and transmission time of data packets.

At the streaming client, media data is received from the transmission channel and buffered in client buffer 80. The parameters of pre-decoder buffer 84 and jitter buffer 82 are set by the buffer controller 110. The parameters are chosen as an aggregate of the server recommended pre-decoder buffering parameters and the additional buffering required as estimated by the client. The client estimates what is needed to tolerate the expected packet transfer delay variation (i.e. jitter) on the available transmission channel. Such aggregate is constrained by the maximum buffering capabilities of the client. Media decoder 90 extracts media data from the client buffer and decodes the media data in a manner appropriate for media type in question. It should be appreciated that the media data will, in general, comprise a number of different media types. For example, if the media data transmitted from the server is representative of a video sequence, it is likely to comprise at least an audio component in addition to video data. It should therefore be understood that media decoder 90, as illustrated in FIG. 1, may actually comprise more than one decoder, for example a video decoder implemented according to a particular video coding standard and an associated audio decoder. As the media data is decoded by media decoder 90, it is output to post-decoder buffer 100 where it is stored temporarily until its scheduled play-out time, at which point it is passed from the post-decoder buffer to display/play-out device 120 under the control of buffer controller 110.

According to the present invention, buffer controller 110 is adapted to provide to the application level signaling engine 70 an indication of the next packet to be decoded. The application level signaling engine is, in turn, adapted to transmit to the streaming server information about the next packet to be decoded, as denoted by reference numeral 300 in FIG. 3. The transmitted information may indicate the sequence number of the packet to be decoded next. In the case of an H.264 payload, the transmitted information indicates the DON of the next NAL. Alternatively, the sequence number of the package that carries the next NAL and DON of that next NAL is signaled to the server. As shown in FIG. 1, the streaming client 60 has a software program 112 including codes for computing the decoding order (y values) of the packets that currently exist in the buffer 80 and determining the next packet to be decoded based on the smallest y value. Based on this finding, the application level signaling engine 70 can signal the sequence number of the next package to be decoded to the streaming server 10.

At the server 10, a software program 36 is used to determine the list of packets in the receiver buffer from the packet SN list 34 and the information provided by the client 60.

It should be noted that, in addition to the interleaved payload format, H.26L also decouples the decoding order and output order. In other words, the decoding order of pictures may not be the same as their output order. In previous coding standards, decoding and output order were allowed to be different only with so-called B frames, for which two reference frames for inter prediction were used, the previous frame and the following frame in output order (i.e., the two previous frames in decoding order). B frames were not used in any profiles of Release 5 codecs. In H.26L the decoding order and output order may differ for any frame. These also have an impact on estimating the buffer. Nevertheless, the present invention is applicable to decoding involving B-frames and, more generally, to the situation when the prediction path is going backwards. In those situations, any time a frame is predicted from a future frame (in the sampling domain), the receiver buffer duration will be less than what would be derived from the OBSN and playout delay signaling.

As for AAC, AAC+ and other mpeg-4 audio streams transmitted using RFC 3640, AU-Index and AU-Index-Delta parameters define a unique index number for each of the audio access units or fragments. The DON is simply equal to this index. Thus, IMPLEMENATION II of the present invention is also applicable to these audio streaming schemes transmitted using RFC 3640.

Thus, although the invention has been described with respect to a preferred embodiment thereof, it will be understood by those skilled in the art that the foregoing and various other changes, omissions and deviations in the form and detail thereof may be made without departing from the scope of this invention.

What is claimed is:

1. A method for controlling level of a receiver buffer in a client in a multimedia streaming network, said method comprising:

determining in the client a next packet to be decoded among packets in a receiver buffer based on decoding order values, wherein the streaming network comprises a server for providing streaming data in a plurality of packets to the client, and wherein at least some of the data packets are stored in the receiver buffer so as to compensate for difference between data transmission amount by the server and the data usage amount by the client, and wherein the packets are decoded in a decoding order based on decoding order values associated with a playout order in the client; and signaling to the server information indicative of said next packet to be decoded, so as to allow the server to adjust the streaming data amount provided to the client based on the information.

2. The method of claim 1, wherein each of the data packets has a sequence number known to both the client and the server, and wherein the information signaled to the server is indicative of the sequence number of said next packet to be decoded.

3. The method of claim 2, wherein the server maintains a list of packet sequence numbers that have been sent and a mapping between said sequence numbers and the decoding order for determining the data packets in the receiver buffer based on said mapping so as to adjust the streaming data amount provided to the client based on said determination in the server.

4. The method of claim 2, wherein the information signaled to the server is further indicative of a difference between a scheduled playout time of said next packet to be decoded and decoding time of said next packet.

5. The method of claim 3, wherein the information signaled to the server is further indicative of the highest sequence number received by the client so as to allow the server to determine the data packets in the receiver buffer.

6. The method of claim 1, wherein the data packets carry a plurality of network abstraction layer (NAL) units, each NAL unit having a decoding order and a decoding order number (DON) indicative of a NAL unit decoding order in a payload structure for transmission, and wherein the information signaled to the server is indicative of the DON associated with said next NAL to be decoded.

7. The method of claim 6, wherein the server maintains a list of NAL units that have been sent and a mapping between said NAL units and the decoding order for determining the data packets in the receiver buffer based on said mapping so as to adjust the streaming data amount provided to the client based on said determination in the server.

8. The method of claim 1, wherein the data packets carry a plurality of network abstraction layer (NAL) units, each NAL unit having a decoding order, and a decoding order number (DON) indicative of a NAL unit decoding order in a payload structure for transmission, and wherein the information signaled to the server is indicative of the sequence number of the data packet that carries the next NAL to be decoded and the DON associated with the decoding order of said next NAL.

9. A multimedia streaming network comprising:

at least a client; and a server for providing streaming data in a plurality of packets to the client, wherein the client comprises:

a receiver buffer for storing at least some of the data packets to be decoded so as to compensate for difference between data transmission amount by the server and data usage amount by the client, and wherein the packets are decoded in a decoding order based on a plurality of decoding values associated with a playout order in the client, and a mechanism for signaling to the server information indicative of the next packet to be decoded among the packets in the buffer based on the decoding order values so as to allow the server to adjust the rate of streaming data provided to the client.

10. The streaming network of claim 9, wherein each of the data packets has a sequence number known to both the client and the server, and wherein the information signaled to the server is indicative of the sequence number of said next packet to be decoded.

11. The streaming network of claim 10, wherein the server maintains a list of packet sequence numbers that have been sent and a mapping between said sequence numbers and the decoding order for determining the data packets in the receiver buffer based on said mapping so as to adjust the streaming data amount provided to the client based on said determination in the server.

12. The streaming network of claim 10, wherein the information signaled to the server is further indicative of a difference between a scheduled playout time of said next packet to be decode and the decoding time of said next packet.

13. The streaming network of claim 11, wherein the information signaled to the server is further indicative of the highest sequence number received by the client so as to allow the server to determine the data packets in the receiver buffer.

14. The streaming network of claim 9, wherein the data packets carry a plurality of network abstraction layer (NAL) units, each NAL unit having a decoding order and a decoding order number (DON) indicative of a NAL unit decoding order in a payload structure for transmission, and wherein the information signaled to the server is indicative of the DON associated with said next NAL to be decoded.

15. The streaming network of claim 14, wherein the server maintains a list of NAL units that have been sent and a mapping between said NAL units and the decoding order for determining the data packets in the receiver buffer based on said mapping so as to adjust the streaming data amount provided to the client based on said determination in the server.

16. The streaming network of claim 9, wherein the data packets carry a plurality of network abstraction layer (NAL) units, each NAL unit having a decoding order, and a decoding order number (DON) indicative of a NAL unit decoding order in a payload structure for transmission, and wherein the information signaled to the server is indicative of the sequence number of the data packet that carries the next NAL to be decoded and the DON associated with the decoding order of said next NAL.

17. An apparatus for use in a client in a multimedia streaming network, said apparatus comprising:

a receiver buffer for storing at least some of data packets to be decoded in the client so as to compensate for difference between data transmission amount by a server and the data usage amount in the client, wherein the server is adapted for providing streaming data in a plurality of packets to the client and the packets are decoded in a decoding order based on a plurality of decoding values associated with a playout order in the client; and a mechanism for signaling to the server information indicative of next packet to be decoded among the packets in the receiver buffer based on the decoding order values so as to allow the server to adjust the streaming data amount provided to the client.

18. The apparatus of claim 17, wherein each of the data packets has a sequence number known to both the client and the server, and wherein the information signaled to the server is indicative of the sequence number of said next packet to be decoded.

19. The apparatus of claim 17, wherein the data packets carry a plurality of network abstraction layer (NAL) units, each NAL unit having a decoding order and a decoding order number (DON) indicative of a NAL unit decoding order in a payload structure for transmission, and wherein the information signaled to the server is indicative of the DON associated with said next NAL to be decoded.

20. The apparatus of claim 17, wherein the data packets carry a plurality of network abstraction layer (NAL) units, each NAL unit having a decoding order, and a decoding order number (DON) indicative of a NAL unit decoding order in a payload structure for transmission, and wherein the information signaled to the server is indicative of the sequence number of the data packet that carries the next NAL to be decoded and the DON associated with the decoding order of said next NAL.

21. The apparatus of claim 17, further comprising
a computer readable storage medium embodied with a software program having executable codes for determining:
the decoding order of the data packets in the receiver buffer based on the decoder order values, and
the next packet to be decoded among the data packets in the receiver buffer based on the decoding order values.

22. An apparatus for use in a server for providing streaming data in a multimedia streaming network, the multimedia streaming network comprising at least a client adapted for receiving the streaming data in a plurality of data packets, said apparatus comprising:
a mechanism for receiving information from the client, wherein the client is adapted for decoding the data packets in a decoding order based on a plurality of decoding order values associated with a playout order and the client comprises a receiver buffer for storing at least some of the data packets so as to compensate for difference between the data transmission amount by the server and data usage amount by the client, the information indicative of the next packet to be decoded among the packets in the receiver buffer based on the decoding order values in the client; and
a computer readable storage medium embodied with a software program having programming codes for determining the packets in the receiver buffer based on the information so as to adjust the streaming data amount provided to the client for controlling level of the receive buffer.

23. The apparatus of claim 22, wherein each of the data packets has a sequence number known to both the client and the server, and wherein the information received from the client is indicative of the sequence number of said next packet to be decoded.

24. The apparatus of claim 22, wherein the data packets carry a plurality of network abstraction layer (NAL) units, each NAL unit having a decoding order and a decoding order number (DON) indicative of a NAL unit decoding order in a payload structure for transmission, and wherein the information received from the client is indicative of the DON associated with said next NAL to be decoded.

25. The apparatus of claim 22, wherein the data packets carry a plurality of network abstraction layer (NAL) units, each NAL unit having a decoding order, and a decoding order number (DON) indicative of a NAL unit decoding order in a payload structure for transmission, and wherein the information received from the client is indicative of the sequence number of the data packet that carries the next NAL to be decoded and the DON associated with the decoding order of said next NAL.

26. A computer readable storage medium embodied with a software program having executable computer codes for use in a client in a multimedia streaming network, the streaming network comprising a server for providing streaming data in a plurality of packets to the client, wherein the packets are decoded in a decoding order in the client based on a plurality of decoding values associated with a playout order in the client, and wherein the client comprises a receiver buffer for storing at least some of the data packets to be decoded so as to compensate for difference between data transmission, wherein the software program, when loaded onto a processor, causes the processor to carry out:
determining the decoding order of the data packets in the receiver buffer based on the decoding order values; and
determining the next packet to be decoded among the data packets in the receiver buffer based on the decoding order values, so as to provide to the server information indicative of said next packet to be decoded, allowing the server to adjust the streaming data amount provided to the client based on the information for controlling level of receiver buffer.

27. The computer readable storage medium of claim 26, wherein each of the data packets has a sequence number known to both the client and the server, and wherein the information provided to the server is indicative of the sequence number of said next packet to be decoded.

28. The computer readable storage medium of claim 26, wherein the data packets carry a plurality of network abstraction layer (NAL) units, each NAL unit having a decoding order and a decoding order number (DON) indicative of a NAL unit decoding order in a payload structure for transmission, and wherein the information provided to the server is indicative of the DON associated with said next NAL to be decoded.

29. The computer readable storage medium of claim 26, wherein the data packets carry a plurality of network abstraction layer (NAL) units, each NAL unit having a decoding order, and a decoding order number (DON) indicative of a NAL unit decoding order in a payload structure for transmission, and wherein the information provided to the server is indicative of the sequence number of the data packet that carries the next NAL to be decoded and the DON associated with the decoding order of said next NAL.

30. A computer readable storage medium embodied with a software program having executable computer codes for use in a server adapted for providing streaming data in the multimedia streaming network, the multimedia network comprising at least a client adapted for receiving the streaming data in a plurality of data packets and decoding the data packets in a decoding order based on a plurality of decoding order values associated with a playout order, wherein the client has a receiver buffer for storing at least some of the data packets so as to compensate for difference between the transmission amount by the server and the data usage amount by the client, wherein the software program, when loaded onto a processor, causes the processor to carry out:
relating the decoding order to the sequence numbers of the data packets having been sent to the client; and
determining the data packets in the receiver buffer based on said relating and on information provided by the client indicative of the next packet to be decoded in the client, so as to allow the server to adjust the streaming data amount provided to the client for controlling level of the receiver buffer.

31. The computer readable storage medium of claim 30, wherein each of the data packets has a sequence number known to both the client and the server, and wherein the information provided by the client is indicative of the sequence number of said next packet to be decoded.

32. The computer readable storage medium of claim 30, wherein the data packets carry a plurality of network abstraction layer (NAL) units, each NAL unit having a decoding order and a decoding order number (DON) indicative of a NAL unit decoding order in a payload structure for transmission, and wherein the information provided by the client is indicative of the DON associated with said next NAL to be decoded.

33. The computer readable storage medium of claim 30, wherein the data packets carry a plurality of network abstraction layer (NAL) units, each NAL unit having a decoding order, and a decoding order number (DON) indicative of a NAL unit decoding order in a payload structure for transmission, and wherein the information provided by the client is indicative of the sequence number of the data packet that carries the next NAL to be decoded and the DON associated with the decoding order of said next NAL.

* * * * *